United States Patent
Roth et al.

(10) Patent No.: US 11,110,852 B2
(45) Date of Patent: Sep. 7, 2021

(54) DEVICE AND METHOD FOR PRODUCING AN OUTPUT LIGHT EMISSION, AND HEADLIGHT

(71) Applicant: VOLKSWAGEN AKTIENGESELLSCHAFT, Wolfsburg (DE)

(72) Inventors: Joscha Roth, Hannover (DE); Heiko Schröder, Braunschweig (DE); Sebastian Thomschke, Braunschweig (DE); Helge Neuner, Wolfenbüttel (DE); Daniel Dias, Rüsselsheim (DE); Michael Schneider, Mainz (DE); Ralf Mayer, Bolanden (DE); Bernd Ludewig, Weinheim (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/610,738

(22) PCT Filed: May 4, 2018

(86) PCT No.: PCT/EP2018/061594
§ 371 (c)(1),
(2) Date: Nov. 4, 2019

(87) PCT Pub. No.: WO2018/202890
PCT Pub. Date: Nov. 8, 2018

(65) Prior Publication Data
US 2020/0164788 A1 May 28, 2020

(30) Foreign Application Priority Data

May 5, 2017 (DE) ..................... 10 2017 109 679.5

(51) Int. Cl.
*F21S 41/25* (2018.01)
*B60Q 1/04* (2006.01)
(Continued)

(52) U.S. Cl.
CPC .............. *B60Q 1/04* (2013.01); *F21S 41/135* (2018.01); *F21S 41/25* (2018.01); *G02B 27/283* (2013.01)

(58) Field of Classification Search
CPC ........ F21S 41/25; F21S 41/135; G02B 27/283
See application file for complete search history.

(56) References Cited

U.S. PATENT DOCUMENTS 5,235,444 A     8/1993   de Vaan
7,450,193 B2 * 11/2008   Seok ..................... H04N 9/3105
                                                           348/E9.027

(Continued)

FOREIGN PATENT DOCUMENTS

DE         69110585 T2    12/1995
DE    102008008664 A1    9/2009
(Continued)

OTHER PUBLICATIONS

Search Report for International Patent Application No. PCT/EP2018/061594; dated Jan. 16, 2019.

*Primary Examiner* — Amy Cohen Johnson
*Assistant Examiner* — Jianzi Chen
(74) *Attorney, Agent, or Firm* — Barnes & Thornburg LLP

(57) ABSTRACT

A device for producing an output light emission having a light source for emitting light and a first polarizing beam splitter element positioned so at least one portion of the emitted light is incident thereupon, wherein a first reflected light beam of a first polarization state and a second transmitted light beam of a second polarization state are produced. The device also includes a first liquid crystal element having at least two states which are actuated using a control unit. The first liquid crystal element at least partially reflects the first light beam, wherein the polarization state of the first light beam is altered based on the state of the first liquid (Continued)

crystal element. The first polarizing beam splitter element is positioned so the first light beam is incident thereupon after reflection at the first liquid crystal element.

13 Claims, 6 Drawing Sheets

(51) Int. Cl.
*F21S 41/135* (2018.01)
*G02B 27/28* (2006.01)

(56) References Cited

U.S. PATENT DOCUMENTS

| | | | | |
|---|---|---|---|---|
| 2010/0328433 | A1* | 12/2010 | Li | G03H 1/2294 |
| | | | | 348/46 |
| 2011/0181801 | A1* | 7/2011 | Okumura | H04N 9/3152 |
| | | | | 349/5 |
| 2015/0177531 | A1* | 6/2015 | Ouderkirk | G02B 27/283 |
| | | | | 353/20 |
| 2015/0373312 | A1* | 12/2015 | Miura | G03B 21/2073 |
| | | | | 349/9 |
| 2016/0124238 | A1* | 5/2016 | Hoang | G03B 21/28 |
| | | | | 353/8 |
| 2016/0169469 | A1* | 6/2016 | Sugiyama | F21S 41/285 |
| | | | | 362/19 |

FOREIGN PATENT DOCUMENTS

| | | |
|---|---|---|
| DE | 102015108847 A1 | 12/2015 |
| DE | 102014113700 A1 | 3/2016 |
| DE | 202016102988 U1 | 6/2016 |
| DE | 102015115348 A1 | 3/2017 |
| EP | 3032168 A1 | 6/2016 |
| JP | 2014007337 A | 1/2014 |
| JP | 2015207390 A | 11/2015 |
| WO | 2015018729 A1 | 2/2015 |
| WO | 2018001581 A1 | 1/2018 |

* cited by examiner

DEVICE AND METHOD FOR PRODUCING AN OUTPUT LIGHT EMISSION, AND HEADLIGHT

PRIORITY CLAIM

This patent application is a U.S. National Phase of International Patent Application No. PCT/EP2018/061594, filed 4 May 2018, which claims priority to German Patent Application No. 10 2017 109 679.5, filed 5 May 2017, the disclosures of which are incorporated herein by reference in their entireties.

SUMMARY

Illustrative embodiments relate to a device for generating an output light emission and to a headlight, in particular, for a transportation vehicle, comprising such a device. Illustrative embodiments further relate to a method for generating an output light emission.

BRIEF DESCRIPTION OF THE DRAWINGS

Disclosed embodiments will now be explained with reference to the drawings.

DETAILED DESCRIPTION

Figure 1:
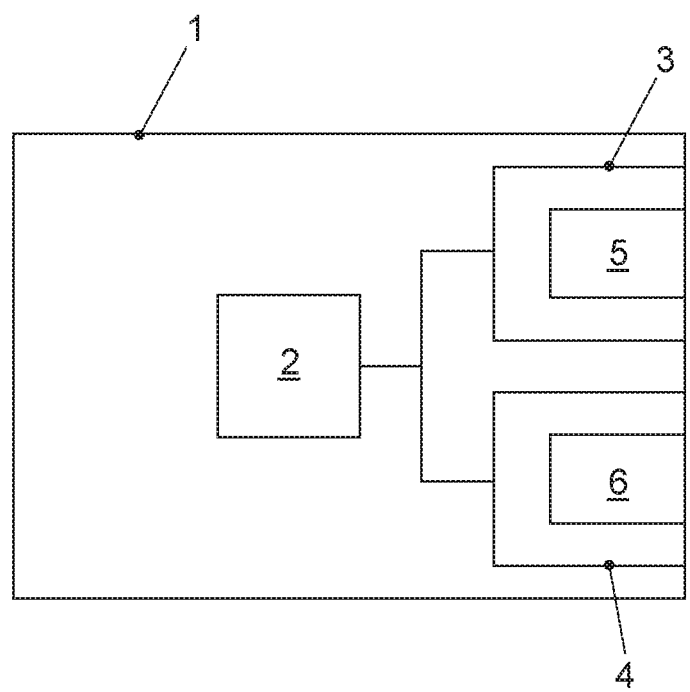
FIG. 1 shows a transportation vehicle with an exemplary embodiment of the disclosed headlights.

The use of liquid crystals for controlling a light distribution is widespread and enables flexible and simple generation and adaptation of light distributions for a wide variety of fields of applications. Efforts are therefore made to extend their field of application to include headlights, in particular of transportation vehicles. By way of example, use is made of technologies from the field of liquid crystal displays (LCDs) or liquid crystals on silicon (LCoS).

In the case of the headlight described in DE 20 2016 102 988 U1, the light from a light source passes through a polarizer and is split into two portions having different polarizations. The two portions are modulated by LCoS chips and impinge on a second polarizer, which combines the light beams and directs at least one part of the light onto an imaging optical unit.

The lighting arrangement described in WO 2015/018729 A1 comprises a light source, which emits light that impinges on a polarization-dependently reflective film. Polarized light that passes through the film impinges on a two-dimensional image generator, which can be embodied as LCoS, for example. In this case, the light is directed onto the image generator by a polarizing beam splitter, is modulated by the image generator and is reflected back to the beam splitter. Depending on its polarization, the light reflected back is transmitted by the beam splitter, or reflected in the direction of the light source.

In the case of the transportation vehicle headlight in accordance with DE 10 2008 008 664 A1, an LCoS display is used to reflect the light generated by a light source and to generate a light distribution adapted to the driving conditions.

Disclosed embodiment provide a device and a method of the type mentioned in the introduction and also a headlight which allow the light emission from a light source to be utilized as efficiently as possible and which offer great flexibility in regard to the structural space required, in particular, in a transportation vehicle.

The disclosed device for generating an output light emission comprises a light source for emitting light and a first polarizing beam splitter element arranged such that at least one portion of the emitted light impinges thereon. In this case, a first reflected light beam of a first polarization state and a second transmitted light beam of a second polarization state are generatable. Furthermore, the device comprises a first liquid crystal element having at least two states which are addressable by a control unit. In this case, the liquid crystal element is configured at least partly to reflect the first light beam, wherein the polarization state of the first light beam is alterable depending on the state of the first liquid crystal element. In this case, furthermore, the first polarizing beam splitter element is arranged such that the first light beam impinges thereon after reflection at the first liquid crystal element, and the first light beam is able at least partly to be coupled out to generate the output light emission.

As a result, an output light emission can be generated which is adaptable easily to a wide variety of requirements and which utilizes the light emitted by the light source efficiently. The device can be flexibly adapted to the available structural space. The output light emission can furthermore be generated such that a high luminescence is achieved in conjunction with a large angular range. For example, with the light available, it is possible to generate a distribution such that a large angular range is illuminated, while specific subranges are illuminated with great intensity.

In contrast to known systems, in the case of the disclosed embodiments, the first polarizing beam splitter element is not just used to separate the first and second light beams, but rather at least the first light beam impinges once again on the same, first polarizing beam splitter element after reflection at the first liquid crystal element. The device can therefore be designed such that the number of components used can be kept as small as possible and, in particular, costly components, such as further polarizing beam splitter elements, for instance, can be saved.

The disclosed embodiments address a number of problems that arise when generating a high-resolution light distribution, in particular, for a high-resolution headlight, with the aid of micromodulators such as DMD, LCD or microscanners. On account of their small structural size, micromodulators require light sources having a high luminescence so that a sufficiently high luminous flux can be efficiently provided and influenced by the modulator. However, the luminescence of present-day light sources is limited. Nevertheless, to satisfy the stringent requirements made of the illuminescence, in particular, in the automotive sector, the angular range of the light distribution is typically decreased, with the result that the light can be distributed over a smaller space and the intensities achieved can be increased.

However, this results in a small illuminated space, which restricts the flexibility and the possibilities for an implementation of new sensor-controlled light functions. A further method leading to higher illuminescences is to enlarge the modulator, for instance, by using a large liquid crystal display (LCD). In this case, although the desired high illuminescences of the light distribution can be obtained, a large optical system, in particular, comprising large lens elements, is required for imaging the light distribution onto the modulator. Since the structural sizes of headlights are becoming ever smaller on account of design requirements, this is deemed to be a drawback. Furthermore, LCDs have a low optical efficiency on account of their low transmittance and the high light power cannot be fully utilized by the modulator since the latter is transilluminated transmissively. Excessive heating of the component can moreover result in the failure thereof.

On the other hand, scanning methods, on account of their temporally dependent exposure, require enormously high peak powers to satisfy the technical lighting requirements of a headlight. Light sources having such peak powers are impractical at the present time—at least in the automotive sector.

In accordance with at least one exemplary embodiment of the disclosed device, therefore, the liquid crystal element is embodied as liquid crystal on silicon (LCoS). As a result, a technology known per se can be used to influence the polarization states of the light beams. The optical efficiency of an LCoS exceeds that of an LCD. In comparison with a disclosed embodiment by micromirror actuators (digital micromirror device, DMD), LCoS elements afford the benefit that larger modulator areas can be used, resulting in a higher etendue, and so more light can be imaged by way of the LCoS. A further benefit with the use of LCoS compared with DMD is the possibility that the light paths can be separated depending on the polarization.

When the light is reflected by an LCoS, the light firstly passes through a liquid crystal layer and impinges on a reflective layer, which is formed from silicon. The reflected light then passes once again through the liquid crystal layer. Upon passing through the liquid crystal layer, the polarization of the light can be altered, wherein the polarization direction of the light is rotated. This alteration of the polarization state by a liquid crystal layer is known per se. Furthermore, it is known to alter a state of the liquid crystal layer by applying a voltage such that a specific alteration of the polarization state, for example, a rotation of the polarization direction by a specific angle, is achieved. With the use of an LCoS, it should be taken into consideration here that the light passes through the liquid crystal layer twice, that is to say that the resultant change in polarization takes place twice. The LCoS is configured such that, depending on the state of the liquid crystal element, that is to say depending on the applied voltage, a rotation of the polarization direction of between 0 and $\lambda/4$ is obtained when passing through the liquid crystal layer once, wherein X denotes the wavelength of the light passing through.

In a further disclosed embodiment, the device furthermore comprises at least one cooling element, by which the first and/or the second liquid crystal element are/is coolable. The heat that arises during operation of the device can thereby be dissipated in a simple manner, with the result that damage to the liquid crystal elements by excessive heat is avoided. Active and/or passive cooling elements can be used.

The light emission by the light source is generated in a manner known per se, wherein various techniques can be used. By way of example, the light can be generated by a white light emitting diode (LED), an RGB LED (LED having red, green and blue components), laser-activated phosphor or an RGB laser. Alternatively or additionally, the light emitted by the light source can be coupled into the device by an optical fiber. With the use of a blue laser, the output light emission generated by the device and modulated by the LCoS can be projected onto a phosphor layer situated upstream of a projection optical unit to achieve a conversion into visible light.

The light emitted by the light source is not limited here with regard to its polarization, but it is unpolarized or circularly polarized. Such a polarization is obtained in the case of typical incandescent lamps and LEDs and also in the case of conventional laser lighting systems whose light is firstly directed onto a phosphorescent lamella to generate a polychromic light emission. The device can furthermore be operated with a linearly polarized light source. The light emitted by a light source can also be used by a plurality of disclosed devices, for example, to generate a specific light distribution on the basis of the light emitted by a light source by a plurality of disclosed devices.

In the case of the disclosed embodiments, the light emitted by the light source is split into two linearly polarized components by the first polarizing beam splitter element, wherein substantially no absorption of light of a specific polarization takes place. A high efficiency of the system is achieved as a result. The polarizing beam splitter element is formed in a manner known per se, in particular, by a film or an optical structure that allows reflection and transmission of light depending on the linear polarization thereof.

The two split components of the light emitted by the light source, that is to say the first and second light beams, are deflected in each case onto a dedicated light path and their polarization can be altered by the liquid crystal element, in particular by a rotation of the polarization direction. This altered polarization can be utilized to generate a specific output light emission, the intensity of which can be controlled by the state of the liquid crystal element and the rotation of the polarization direction associated therewith. The first or a second beam splitter element can be used for combining two light beams, wherein differently polarized components of the output light emission are superimposed and an output light emission can be coupled out.

In at least one disclosed embodiment, the first liquid crystal element is furthermore configured at least partly to reflect the second light beam. As a result, a single liquid crystal element can be used to control an alteration of the polarization states of the two light beams.

In the case of such a disclosed embodiment, the liquid crystal element is used efficiently since it is used to alter the polarization states of the first and second light beams. Reflective elements can be used to divert the light beams onto an optical path such that they can be guided separately from one another and nevertheless both impinge on the liquid crystal element.

In a further disclosed embodiment, the first and second light beams impinge on the same region of the liquid crystal element. Parts of the first and second light beams respectively impinge on the same region of the liquid crystal element. As a result, the same area of the liquid crystal element is used to modulate the polarization directions of the differently polarized portions of the light. This additionally allows costly optical components to be saved or embodied with smaller dimensions, and a more compact, simpler optical set-up. Within the meaning of the disclosure, "the same region" is understood to mean that the light beams impinge substantially on the same regions. Alternatively, the liquid crystal elements can have mutually separate regions on which the light beams respectively impinge.

Furthermore, the liquid crystal element can be embodied such that the impinging and reflected light is modulated differently at different positions of the area of the liquid crystal element, for instance, by a matrix of regions which are separately addressable and can modulate the polarization of the impinging light independently of one another. Here parts of the two differently polarized portions of the light respectively impinge on the same regions on the surface of the liquid crystal element.

In a further disclosed embodiment, the device furthermore comprises a second liquid crystal element, wherein the second liquid crystal element is configured at least partly to reflect the second light beam, wherein the polarization state of the second light beam is alterable depending on the state of the second liquid crystal element. By virtue of the use of at least two liquid crystal elements, the two light beams generated by the first polarizing beam splitter element on the basis of the emitted light can be influenced separately from one another in terms of their polarization states. Such a disclosed embodiment therefore allows complex output light emission to be generated.

In at least one disclosed embodiment, to generate the output light emission, the first and second light beams impinge on the first polarizing beam splitter element and are combined. As a result, both light beams generated on the basis of the light emitted by the light source and having different polarization states can be utilized for generating the output light emission and, in particular, a high light intensity within the output light emission can be achieved.

Combining the light beams within the meaning of the disclosure involves superimposing the light such that there is no longer any spatial separation between the light beams. Thus, the light of the output light emission does not emerge in a spatially separated manner in accordance with the different light beams, rather one light beam having a superimposition of light of the two light beams separated at the first beam splitter element can be coupled out. What can be achieved by combining the light beams is that the etendue of the output light emission generated is not increased unnecessarily.

In various disclosed embodiments, the first and second light beams can be modulated in different ways before being combined, with the result that, for example, differently formed intensity distributions can be superimposed. In this case, the output light emission can be formed by respectively different intensity distributions being formed for the first and the second light beam, respectively, for instance, on the basis of a different modulation of the polarization states by the liquid crystal element.

In accordance with at least one disclosed embodiment, the device furthermore comprises a second polarizing beam splitter element, on which the second transmitted light beam impinges and by which the second light beam is able at least partly to be coupled out to generate the output light emission. As a result, the portions of the light emitted by the light source which are separated by the first beam splitter element can be coupled out separately and utilized, for example, for different light functions or for more flexible configuration of the output light emission.

In the case of such a disclosed embodiment, provision can be made for the first and second light beams not to be combined, but rather to be coupled out such that the output light emission comprises at least two spatially separated light beams. By way of example the output light emission can comprise light beams which run in different directions. Alternatively or additionally, the light beams can run next to one another or in a manner separated from one another in some other way. Moreover, the light beams of the output light emission can have an overlap region, for example, in a region of an image plane, wherein the light beams generate an imaging in this region as a result of superimposition.

In one development, the output light emission comprises a first component and a second component, wherein the first component is able to be coupled out by the first polarizing beam splitter element and the second component is able to be coupled out by the second polarizing beam splitter element. In this case, the first and second components are able to be coupled out at positions spaced apart from one another. The first component of the output light emission comprises at least one part of the first reflected light beam and the second component comprises at least one part of the second transmitted light beam.

As a result, the light of the first and second light beams can be modulated efficiently such that the different components of the output light emission are embodied flexibly and in a manner adapted to the requirement.

Provision can be made here for the first component to comprise no light of the first light beam and/or for the second component to comprise no light of the second light beam.

In a further development, the first and/or the second liquid crystal element are/is embodied as a first and/or a second matrix of pixels. The pixels are embodied as picture elements.

A liquid crystal layer of the liquid crystal element is addressable separately in the region of a pixel, that is to say that the polarization state of the light that impinges on the liquid crystal element in the region of a pixel is altered in a specific way depending on the addressing of the pixel. The addressing is effected by a voltage applied to the liquid crystal layer of the LCoS in the region of the respective pixel.

In at least one disclosed embodiment, to generate the output light emission, the first and second light beams are able to be coupled out by a projection optical unit. As a result, a the output light emission coupled out can be formed and modified by the projection optical unit.

The projection optical unit can be utilized to form the properties of the projection in a specific way depending on the imaging properties of the projection optical unit. By way of example, the projection optical unit can bring about focusing or spreading of the light beams.

In this case, the projection optical unit is formed in a manner known per se, for example, in the manner of a lens. It can be embodied such that its imaging properties can be set, for example, by a focal length being set or distorting imaging properties being altered. For this purpose, the projection optical unit can comprise lens elements and/or reflective elements, for example, the arrangement of which can be alterable, for instance, to adapt the projection optical unit for a specific device, for instance, in a transportation vehicle, or to carry out an automatic adaptation of the imaging properties to altered ambient conditions.

In at least one disclosed embodiment, to generate the output light emission, the first light beam is able at least partly to be coupled out by a first projection optical unit, and the second light beam by a second projection optical unit. The use of separate projection optical units for the different light beams makes it possible to generate a more flexible output light emission which is configurable in more diverse ways. In the case of such a disclosed embodiment, the output light emission comprises two spatially separated parts, in particular, two spatially separated light beams.

An imaging is projected by the projection optical unit. For example, when the device is used in a transportation vehicle, the imaging can be projected on a roadway and/or surroundings of the transportation vehicle. By way of example, the arrangement can be effected such that an object plane is formed by the liquid crystal element, in particular, an LCoS, and an image of the light distribution modulated there is projected into an image plane. The liquid crystal element comprises a multiplicity of pixels arranged on the basis of a matrix, for example, wherein the polarization state of the respectively impinging light can be individually modulated for each pixel. By suitable guidance of the optical path, for example, with the inclusion of a polarizing filter and/or a polarizing beam splitter element, the modulation of the polarization states can be used to generate an intensity distribution of the light. By the projection optical unit, such an intensity distribution can be imaged, for example, on a road or in an image plane, wherein an output light emission can be characterized by the specific intensity distribution in the image plane. By way of example, legal stipulations for the use of headlights in transportation vehicles provide specific light distributions which are rated in a specific image plane relative to the headlight or to the transportation vehicle having the headlight.

The generated imaging of the output light emission comprises an intensity distribution in a specific image plane that is arranged relative to the device. In this case, the intensity distribution can be generated by the first or second light beam coupled out; alternatively or additionally, a superimposition of the light beams can be used, wherein the latter can be combined in this case. Alternatively or additionally, they can be coupled out separately and be superimposed for the imaging.

In a further disclosed embodiment, the first projection optical unit and/or the second projection optical unit are/is configured to generate the output light emission on the basis of the light beam coupled in such that the output light emission comprises an imaging having at least one inner and one outer region, wherein the imaging is embodied such that the inner region has a higher light intensity than the outer region. As a result, high light intensities can be achieved in the inner region of the output light emission, which is of great importance for many applications, in particular, in transportation vehicle headlights.

The imaging comprises an intensity distribution which is generated on the basis of a modulation of the polarization states of the light in different regions of the liquid crystal element. For this purpose, a matrix of pixels of the liquid crystal element is used, by which respectively different polarization states of the reflected light or modulations thereof are generated. After reflection at the liquid crystal element, the light passes through a polarizing beam splitter element, a polarizing filter or some other optical element that brings about a conversion of the different polarization states into an intensity distribution. In this way, it is possible to effect an imaging of the distribution of the polarization states within a light beam as an intensity distribution.

By way of example, at least one projection optical unit is embodied as a distorting projection optical unit, wherein the central pixels are imaged smaller than pixels arranged further out. As a result, the intensity in the image center of the light distribution can be increased, in particular, to satisfy specific technical lighting requirements, for instance, for a use of the device in a transportation vehicle.

In this case, inner and outer regions are defined relative to a light distribution in an image plane onto which the imaging is projected by the projection optical unit. Furthermore, in this context, the higher or lower light intensity should be understood as a specific value. That is to say that an imaging is generated by the projection optical unit such that for the same original intensity of the imaged light distribution, a higher or lower intensity is achieved within the imaging, in particular, in the image plane. That is to say that the imaging properties of the projection optical unit result in a changed distribution of the intensity within the imaging generated. The imaged intensity distribution itself is considered independently of this, within which intensity distribution regions of higher or lower intensity are generated by the modulation of the polarization states, for instance, by pixels of an LCoS.

In further exemplary embodiments, the intensity distribution formed by the projection optical unit can also be effected in some other way, in particular, with a distortion formed in some other way, wherein, for example, outer regions are imaged with higher intensity than in the case of the inner regions.

In one development, the output light emission comprises a superimposition of at least two imagings, wherein the at least two imagings are generated by at least two projection optical units. The superimposition of two imagings to form an output light emission makes possible a disclosed embodiment of the output light emission which is configured with greater differentiation and is easily alterable.

By way of example, disclosed embodiments can provide for two light beams to be coupled out by separate projection optical units on the basis of the two light beams which are formed by the first polarizing beam splitter element, to generate the output light emission. The light beams coupled out can be modulated independently of one another, for example, by reflection at a respective liquid crystal element having individually addressable pixels.

The disclosed headlight comprises at least one device of the type described above. As a result, the disclosed embodiment can be used in a relevant field, in particular, for transportation vehicles. In this case, the device can be integrated into the headlight in various ways.

In at least one exemplary embodiment of the disclosed headlight, the headlight furthermore comprises at least one projection optical unit having imaging properties enabling the first and/or the second light beam to be coupled out to generate the output light emission. In this case, the imaging properties of the projection optical unit are adjustable by a control unit. The output light emission can be formed easily in this way.

By way of example, a smaller and a larger light distribution can be generated by the projection optical units, which light distributions are superimposed to generate the output light emission. Furthermore, light distribution offset spatially with respect to one another can be generated and superimposed. The projection optical unit can furthermore be formed such that its imaging properties are alterable, for example, by an alteration of the arrangement of optically effective elements relative to one another and/or relative to other components of the headlight.

Provision is made for the light emitted by a single light source to be used for the generation of the output light emission in the case of the disclosure, wherein the output light emission can be generated by a superimposition of light distributions that are coupled out by a plurality of projection optical units. Alternatively or additionally, provision can be made for a plurality of the disclosed devices to be used, for example, in a transportation vehicle having two headlights, and for the output light emissions generated by the devices in turn to be superimposed.

In the disclosed method for generating an output light emission, light is emitted by a light source. At least one part of the emitted light impinges on a first polarizing beam splitter element, wherein a first reflected light beam of a first polarization state and a second transmitted light beam of a second polarization state are generated. The first light beam is at least partly reflected by a first liquid crystal element, wherein the first liquid crystal element has at least two states which are addressed by a control unit, and wherein the polarization state of the first light beam is altered depending on the state of the first liquid crystal element. The first light beam impinges on the first polarizing beam splitter element after reflection at the first liquid crystal element. The first light beam is at least partly coupled out to generate the output light emission.

The disclosed method is embodied for being carried out by the above-described device. The method thus has the same benefits as the disclosed device.

A transportation vehicle with at least one exemplary embodiment of the disclosed headlights will be explained with reference to FIG. 1.

A transportation vehicle 1 comprises two headlights 3, 4, which respectively comprise a device 5, 6 according to the disclosed embodiments. The headlights 3, 4 are coupled to a control unit 2, by which the devices 5, 6 can be driven to set output light emissions that are generatable by the headlights 3, 4.

Figure 2:
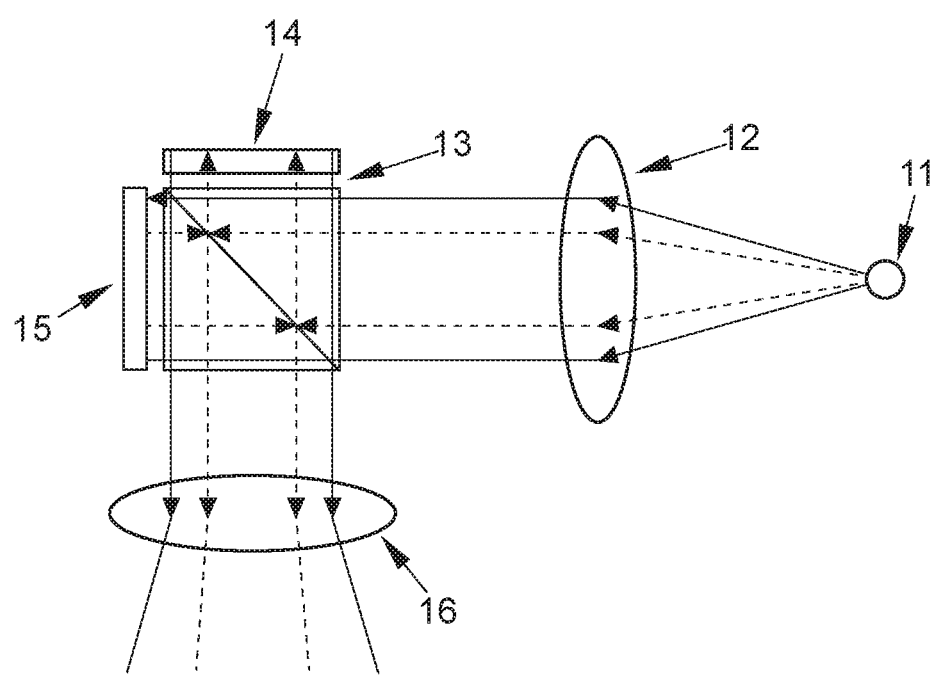
FIG. 2 shows a first exemplary embodiment of the disclosed device.

A first exemplary embodiment of the disclosed device will be explained with reference to FIG. 2.

The device illustrated schematically comprises a light source 11, which emits unpolarized light, here with a circular (SP) polarization. In the example, the light source 11 can be embodied, for example, as a light emitting diode, an incandescent lamp or in some other way known per se. The light source 11 can furthermore generate light for a plurality of devices, wherein the emitted light can be guided along an optical path in various ways known per se.

In the exemplary embodiment, the light emitted by the light source 11 impinges on an illumination optical unit 12 and is focused by the latter and directed onto a polarizing beam splitter element 13. The light emitted by a light source typically has two polarization directions, illustrated by the dashed and solid lines in FIG. 2. In further exemplary embodiments, no illumination optical unit 12 or a different unit having a comparable function is provided.

The polarizing beam splitter element 13 is embodied in a manner known per se, for example, as a polarizing beam splitter (PBS), and serves to split the unpolarized or circularly polarized light into two light beams, each of which is linearly polarized. One light beam having a specific linear polarization state is reflected here; the other light beam having the corresponding complementary linear polarization can pass through the polarizing beam splitter element 13. In this case, substantially no light is absorbed, rather the unpolarized or circularly polarized light is split and two light beams are generated, which are S- and P-polarized, respectively.

This is in contrast to known methods, for instance, using an LCD, in which linearly polarized light is obtained by a polarizing filter that absorbs light of a specific polarization state and transmits complementarily linearly polarized light. In the disclosed method, by contrast, both light beams polarized complementarily to one another can be utilized and considerable light losses are avoided. This results in a significantly increased efficiency in the utilization of the light source 11.

In the exemplary embodiment, the reflected light beam impinges on a first liquid crystal element 14, and the transmitted light beam impinges on a second liquid crystal element 15. The liquid crystal element 14, 15 are embodied as LCoS 14, 15. They each comprise a liquid crystal layer above a reflective layer, which is formed from silicon. Light impinging on the LCoS 14, 15 firstly passes through the liquid crystal layer, is reflected by the reflective layer and passes through the liquid crystal layer a second time. In this case, it is provided that the liquid crystal layer can be brought to different states by applying an electrical voltage, in which states the polarization of light passing through is changed in a specific way. In the course of passing through, the polarization direction is rotated by a specific angle, wherein passing through twice means that the set angle of rotation is doubled. By way of example, by an applied voltage, it is possible to set a rotation of the polarization direction of between 0 and $\lambda/4$ upon passing through the liquid crystal layer once, which results in a total rotation of the polarization direction of the light reflected by the LCoS 14, 15 of between 0 and $\lambda/2$.

In the exemplary embodiment, the liquid crystal layer comprises a multiplicity of individually addressable regions arranged in a matrix. These individually addressable regions form a matrix of pixels of the respective LCoS element 14, 15, wherein each of the pixels thereof is individually addressable. For this purpose, an individual voltage can be applied to the liquid crystal layer in the region of a pixel. A linearly polarized light beam impinging on the LCoS 14, 15 can thus be modulated differently in its polarization direction depending on the location at which it impinges on the liquid crystal layer of the LCoS 14, 15.

In the exemplary embodiment, the light beams generated by the polarizing beam splitter element 13 respectively impinge on the LCoS 14, 15 and are reflected back from the latter onto the polarizing beam splitter element 13. If the LCoS elements 14, 15 are in a state in which they do not cause the polarization of the impinging light to be changed, the light beams are reflected or respectively transmitted at the polarizing beam splitter element 13 such that they are projected in the direction of the light source 11. However, if the polarization of at least one of the light beams was altered by one of the LCoS elements 14, 15, then the light beam reflected back is split into its two linearly polarized portions again by the polarizing beam splitter element 13, which are correspondingly transmitted or reflected. In this way, at least one part of the light reflected back can be guided in the direction of a projection optical unit 16 and be coupled out there to generate the output light emission.

By way of example, the polarizing beam splitter element 13 can reflect S-polarized light (dashed line) and transmit P-polarized light (solid line). In this case, an S-polarized light beam impinges on a first LCoS 14. If the LCoS 14 brings about a rotation of the polarization direction, then the light reflected back is at least partly P-polarized. The light is reflected back by the LCoS 14 onto the polarizing beam splitter element 13, where the P-polarized portion is then transmitted and coupled into the projection optical unit 16. By contrast, the S-polarized portion is reflected and returned in the direction of the light source 11. Conversely, in this example, the P-polarized portion of the light emitted by the light source 11 is transmitted by the polarizing beam splitter element 13 and impinges on a second LCoS 15, which in turn can rotate the polarization direction of the impinging light, such that the light reflected back onto the polarizing beam splitter element 13 is at least partly S-polarized and can then be reflected and coupled into the projection optical unit 16.

The exemplary embodiment thus provides for the different polarization states of the light emitted by the light source 11 firstly to be separated by the polarizing beam splitter element 13, and if appropriate modulated, and then combined again. Depending on the configuration of the LCoS elements 14, 15, the output light emission can thus comprise portions of different polarization directions.

In a further exemplary embodiment, just one LCoS 14, 15 can be provided and the light beam of the respective other polarization state can be coupled out in some other way or be discarded, for instance, by absorption. This case is similar to the procedure in known devices in which only one polarization direction of the light emitted by the light source 11 is utilized for generating an output light emission. In this case, the light emitted by the light source 11 is not fully utilized and an approximately 50% lower efficiency is achieved. That is to say that, by virtue of the concept illustrated in FIG. 2, both polarization directions can be utilized and an increased efficiency vis-à-vis known devices can thus be achieved.

In the exemplary embodiment, the LCoS elements 14, 15 each comprise a matrix of pixels, in the region of which the of the liquid crystal layer can be individually addressed in each case. In this way, an image can be modulated by the alteration of the polarization direction and depending on the resolution of the LCoS elements 14, 15, wherein the polarization direction of impinging light is altered depending on the addressing of the pixels.

In a further exemplary embodiment, a laser light source having a defined linear polarization can be used as the light source 1. Only one LCoS 14, 15 is required in this case. If a blue laser is utilized, which laser emits electromagnetic radiation in the ultraviolet, that is to say invisible, range, the image generated by modulation of the polarization by the LCoS 14, 15 can be projected onto a phosphor which is situated upstream of the projection optical unit and by which a light emission in the visible light range can be generated and imaged.

Alternatively or additionally, an RGB light source (for instance, laser or LED) can be used. Furthermore, a multicolored image can be generated, wherein here it is possible to provide a sequential set-up by a plurality of light channels, for example, by way of a corresponding circuit of the light source. However, this can be accompanied by a lower output power of the output light emission since the color channels red, green and blue have to be addressed successively.

The illumination optical unit 12 and the projection optical unit 16 are formed in a manner known per se and can comprise a plurality of lens elements. The projection optical unit can be embodied in a manner of a lens, for example, and provision can be made for its imaging properties to be adjustable. By way of example, a variable or adjustable focal length can be provided. Furthermore, imaging properties which result in a distorting imaging, for instance, can be provided. One example of this is explained in detail further below. The projection optical unit can furthermore comprise reflective elements and/or other optical elements. The arrangement of the optical elements, in particular, lens elements and mirrors, can be alterable. Furthermore, it can be provided that a setting of the illumination optical unit 12 and/or of the projection optical unit 16 can be carried out by the control unit 2.

In a further exemplary embodiment, it is provided that, in the case of at least one of the LCoS elements 14, 15, a cooling element is arranged such that it is possible to dissipate heat from the LCoS 14, 15. The use of an LCoS 14, 15 in the manner illustrated in FIG. 2 typically results in heating, which, in the case of a high input power, that is to say in the case of a high intensity of the light coupled in by the illumination optical unit 12, can result in overheating and damage of the LCoS 14, 15. One benefit of the use of LCoS elements 14, 15 such as is made possible by the disclosed embodiments resides in the fact that cooling can be implemented simply, in particular, by the rear side, facing away from the liquid crystal layer, being arranged in thermal contact with a cooling element. The cooling element can be of passive or active embodiment in a manner known per se.

A second exemplary embodiment of the disclosed device will be explained with reference to FIG. 3. The differences in relation to the first exemplary embodiment explained above will be discussed here.

Figure 3:
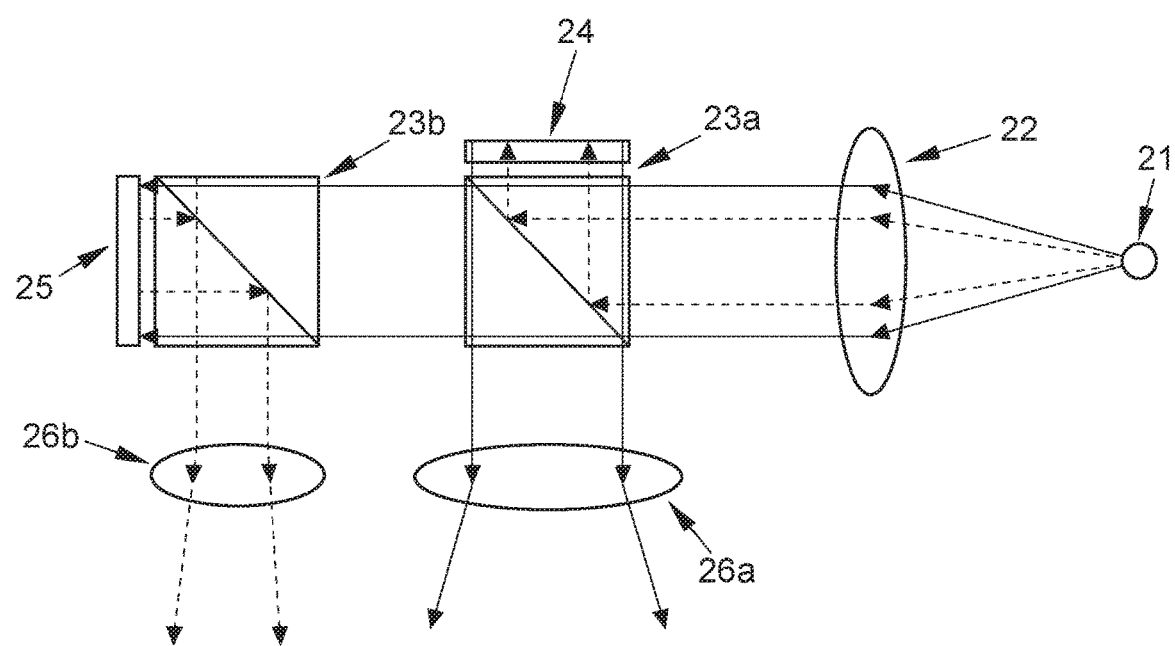
FIG. 3 shows a second exemplary embodiment of the disclosed device.

In the exemplary embodiment illustrated in FIG. 3, the separation of the two light beams having different polarization directions is utilized to generate an output light emission by two projection optical units 26a, 26b.

The light emitted by the light source 21 is directed by the illumination optical unit 22 onto a first polarizing beam splitter element 23a, where it is split into two light beams linearly polarized complementarily to one another, as already described above with reference to FIG. 2. For this purpose, a first light beam of a first polarization direction is reflected, while a second light beam of the complementary second polarization direction is transmitted.

The first light beam (dashed line) impinges on a first LCoS 24 and can be influenced in its polarization by the state of the liquid crystal layer of the LCoS 24. The first light beam is reflected at the LCoS 24 and impinges a further time on the polarizing beam splitter element 23a, where the portion of the first polarization direction that remains after the modulation at the LCoS 24 is reflected in the direction of the light source and the portion of the complementary second polarization direction is directed in the direction of a first projection optical unit 26a. A first component of the output light emission is generated depending on the imaging properties of the first projection optical unit 26a.

The second light beam of the complementary second polarization direction (solid line) impinges on a second polarizing beam splitter element 23b, which, in the exemplary embodiment, is embodied in the same way as the first polarizing beam splitter element 23a. That is to say that the second light beam is also transmitted in the second polarizing beam splitter element 23b and impinges on a second LCoS 25. The latter, analogously to the first LCoS 24 described above, can modulate the polarization direction of the impinging and reflected light. The light reflected at the second LCoS 25 then has a polarization modulated depending on the state of the liquid crystal layer of the second LCoS 25 and can be partly reflected or respectively transmitted at the second polarizing beam splitter element 23b. The reflected portion is directed onto a second projection optical unit 26b and can be coupled out by the latter. The second projection optical unit 26b generates a second component of the output light emission, which is in turn dependent on the imaging properties of the second projection optical unit 26b.

Analogously to the first exemplary embodiment explained with reference to FIG. 2, in the case of the exemplary embodiment illustrated in FIG. 3 as well, provision is made for the LCoS elements 24, 25 each to have a matrix of pixels, in the region of which the liquid crystal layer is individually addressable. That is to say that the polarization state of the light reflected at the LCoS 24, 25 can be individually modulated for each pixel.

Provision can be made for the two projection optical units 26a, 26b to have different imaging scales. By virtue of the fact that, for example, the imaging of the image generated on the basis of the modulation at the LCoS 24, 25 is effected by a projection optical unit 26a, 26b on different scales, it is possible to achieve a higher or lower intensity of the light at a position of the imaging. For this purpose, the projection is effected such that the imaging is effected onto a smaller or larger area and the luminous flux ensuing therefrom here is correspondingly higher or lower. One of the projection optical units 26a, 26b can thus be implemented, for example, as a kind of booster to achieve a specific high illuminance in a smaller region of the output light emission. The output light emission then comprises one region having a lower light intensity and another region having a higher light intensity.

Furthermore, the projection optical units 26a, 26b can pertain to different regions within the output light emission, wherein spatially separated regions are illuminated. Furthermore, the two projection optical units 26a, 26b can be embodied with different imaging properties, for example, with different distortions, different imaging scales and/or different focal lengths.

A third exemplary embodiment of the disclosed device will be explained with reference to FIGS. 4A and 4B. The differences with respect to the first and second exemplary embodiments explained above will be discussed here.

In this exemplary embodiment, the disclosure is realized by a single polarizing beam splitter element 33 and a single LCoS 34. In other words, differently linearly polarized portions of the light generated by the light source 31 are optically guided separately and can be used jointly for generating the output light emission. In this case, however, both portions having different polarization directions can be modulated by the one LCoS 34. In this case, the differently polarized portions of the light impinge on the LCoS 34 in the same region, that is to say that the same area of the LCoS 34 is used to modulate the polarization directions. As a result, costly optical components can be saved and the optical set-up can be implemented in a simple manner.

Furthermore, the LCoS 34 can be embodied such that the impinging and reflected light is modulated differently at different positions of the area of the LCoS 34. By way of example, a matrix in the manner of pixels (picture elements) can be formed within the area of the LCoS 34, wherein a separately addressable area corresponds to each pixel and, for each pixel of the matrix, a modulation that is independent of the other pixels can be performed. In this case parts of the two differently polarized portions of the light respectively impinge on the same pixels of the LCoS 34.

Figure 4A:
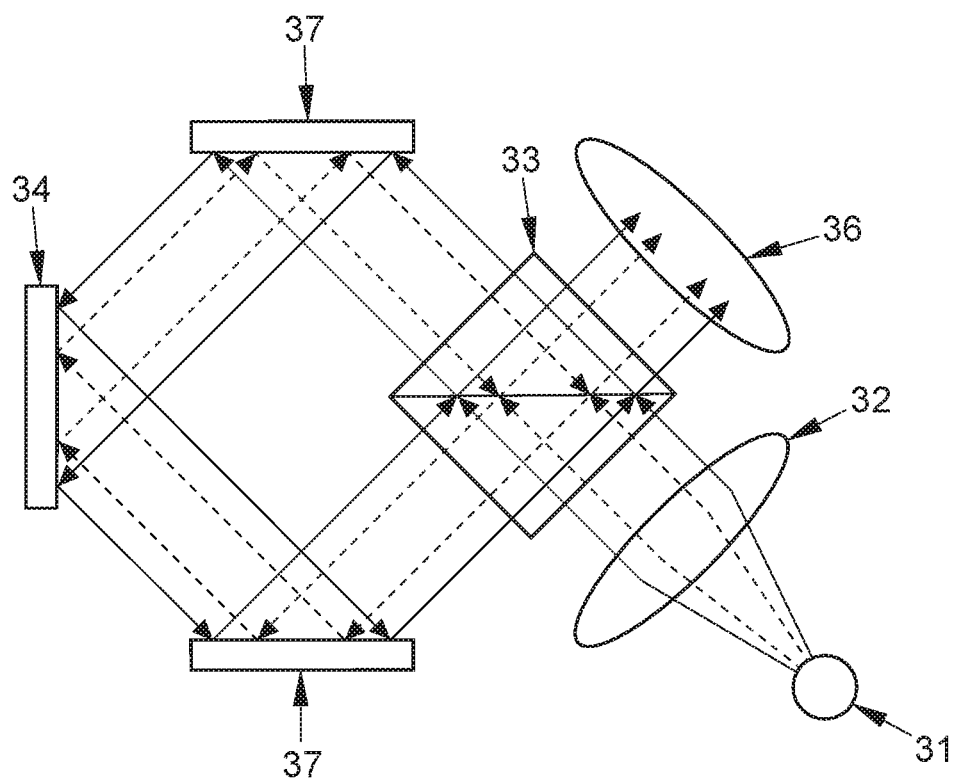
FIGS. 4A and 4B show a third exemplary embodiment of the disclosed device.
Figure 4B:
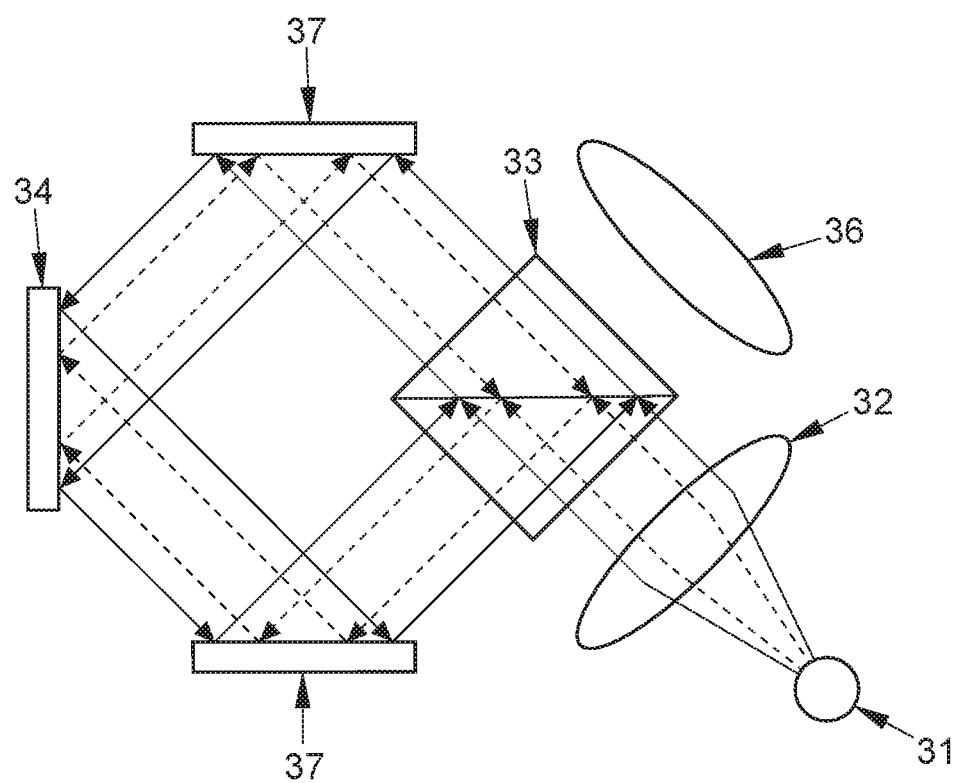

FIG. 4A shows the device in accordance with the exemplary embodiment in an ON state, while FIG. 4B shows the device in an OFF state. In other words, in the exemplary embodiment, the extreme states are shown here, while intermediate states, as already explained above with reference to FIGS. 2 and 3, are likewise conceivable, of course.

Light emitted by the light source 31 is directed by the illumination optical unit 32 onto the polarizing beam splitter element 33, where a first and a second light beam are generated by reflection and transmission, respectively, of the two mutually complementary polarization directions. The two light beams are respectively directed by mirrors 37 onto the LCoS 34, where they pass through the liquid crystal layer of the LCoS 34, are reflected behind that and pass through the liquid crystal layer a further time. In the exemplary embodiment, as already in the exemplary embodiment explained above, provision is made for the liquid crystal layer to comprise pixels which are addressable in each case individually by an applied voltage. Depending on the state of a pixel, that is to say depending on the applied voltage, the polarization of light passing through the liquid crystal layer is altered, wherein the polarization direction is rotated by a specific angle.

In the case illustrated as ON state in FIG. 4A, in contrast to the case illustrated as OFF state in FIG. 4B, the polarization of the light impinging on the LCoS 34 is not influenced.

In the ON state illustrated in FIG. 4A, light having the polarization indicated as a dashed line firstly impinges on the polarizing beam splitter element 33 and is deflected by the latter onto a mirror 37. The latter reflects the light further onto the LCoS 34, which in this case does not influence the polarization and reflects the light onto a further mirror 37. The latter reflects the light onto the polarizing beam splitter element 33, at which the light is in turn reflected and deflected in the direction of the projection optical unit 36.

The light having the other polarization direction, indicated as a solid line, is transmitted by the polarizing beam splitter element 33 and is reflected via a mirror 37 onto the LCoS 37. The latter does not change the polarization properties in this case and reflects the light via a further mirror 37 onto the polarizing beam splitter element 33. The light once again passes through and is coupled into the projection optical unit 96.

Consequently, both polarization directions of the light source 31 can be used with the use of only one LCoS 34.

In the OFF state illustrated in FIG. 4B, the light incident on the LCoS 34 is altered in its polarization such that the light emitted by the light source 31 is ultimately reflected back into the latter and no light passes into the projection optical unit 36. In this case, a rotation of the polarization direction by 90° or λ/2 is attained at the LCoS 34.

In intermediate states, that is to say if the polarization direction is rotated by an angle of between 0 and 90° by the LCoS 34, only part of the light is coupled out by the projection optical unit 36, while the remainder is reflected back in the direction of the light source 31.

An exemplary simulation of an intensity distribution such as can be generated by the disclosed method will be explained with reference to FIGS. 5A to 5C. The above-described exemplary embodiments of the disclosed device are taken as a basis here.

To achieve the high illuminances required for a headlight in a transportation vehicle, in particular, the disclosed embodiment of the systems shown with a distorting projection optical unit is provided according to the disclosed embodiments. In the exemplary case illustrated here, the projection optical unit 16, 26a, 26b, 36 distorts the light distribution such that the central pixels of the LCoS 14, 15, 24, 26, 34 are imaged smaller than pixels arranged further out. As a result, the illuminance in the center can be increased and, for example, legal requirements in respect of traffic can be satisfied.

The distortion of the imaging can be compensated for by a digital predistortion, for example, to project an output light emission having a very specific shape of the light distribution. For this purpose, in at least one disclosed embodiment, provision can furthermore be made for the imaging properties of the projection optical unit to be detected and a corresponding predistortion to be generated.

The distortion of the image ensures that the resolution of the representable light distribution is of different magnitudes in different regions, since the imaged pixels occupy different areas. At the same time the illuminance of the light distribution is increased for the pixels imaged on a smaller area compared with the larger areas of the further pixels.

The distortion can be formed to such a degree that the illuminances required by legal provisions in respect of traffic and traffic conditions are achieved. The higher the luminances that can be provided by the light source 11, 21, 31 and the further optical elements of the device, the smaller the distortion can be made.

Figure 5A:
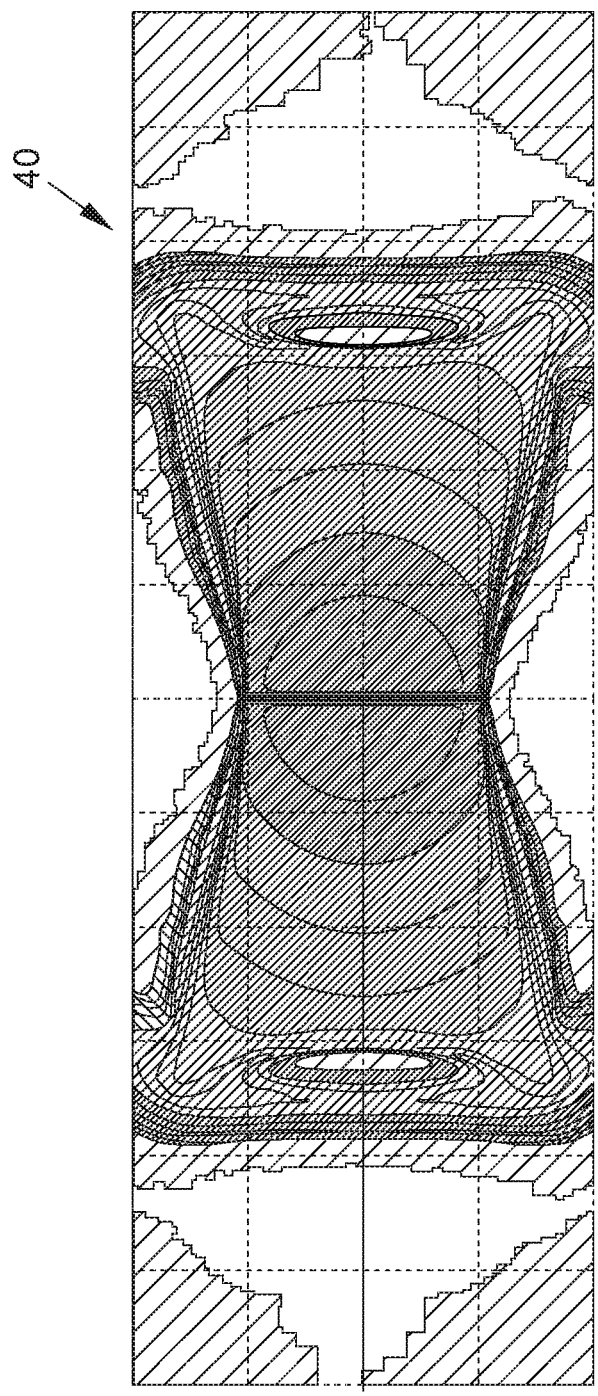
FIGS. 5A to 5C show an exemplary simulation of an intensity distribution such as can be generated by the disclosed method.

FIG. 5A shows by way of example a simulated illuminance distribution of a distorted light distribution. This assumes that an image of an LCoS 14, 15, 24, 25, 34 embodied in a rectangular state is imaged, for example, measured by a ground-glass screen perpendicular to the central emission direction of the device, as is provided for the assessment of transportation vehicle headlights. The lines illustrated in the Figure are intended to indicate regions of substantially identical light intensity. In this case, the intensity becomes greater toward the center.

Figure 5B:
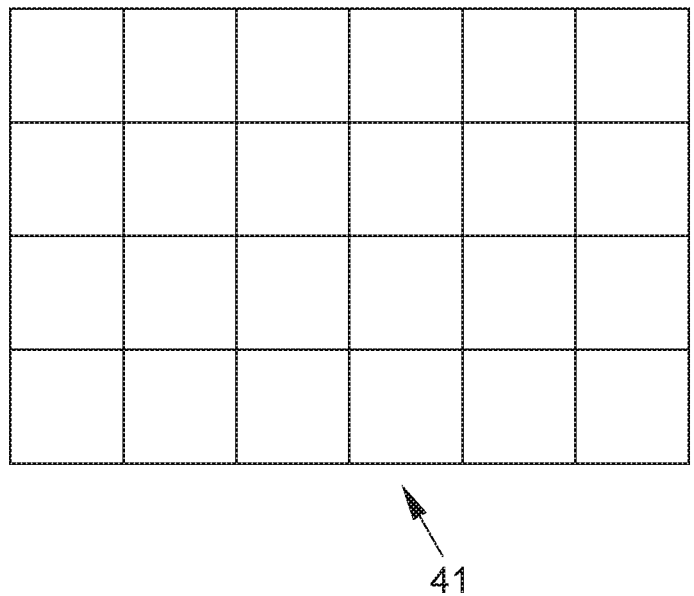
Figure 5C:
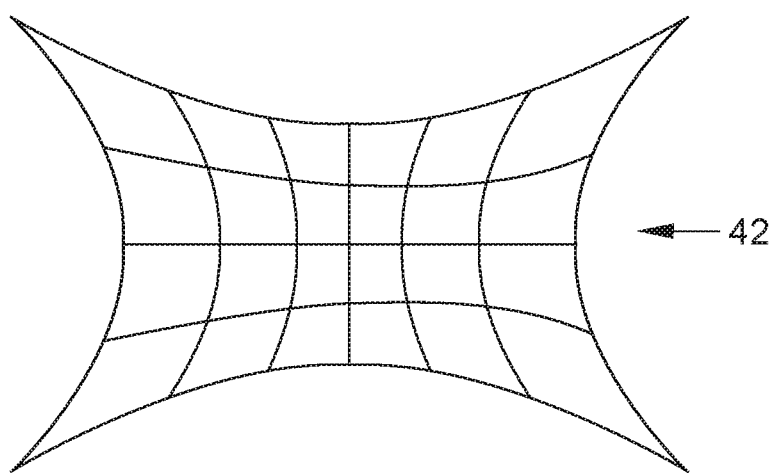

FIG. 5B shows a regular grid 41 of 4×6 pixels. This imaging represents by way of example the arrangement of the pixels on a rectangular LCoS 14, 15, 24, 26, 34. FIG. 5C schematically shows how the grid 41 in the object plane can be imaged as a distorted grid 42 in the image plane by a distorting projection optical unit 16, 26a, 26b, 36. In this case, pixels arranged in the vicinity of the center are imaged smaller than the outer pixels, with the result that the luminous flux in the regions in which the central pixels are imaged is higher than in the outer regions.

The influence of the imaging properties of the projection optical unit 16, 26a, 26b, 36 on the light intensity in the individual regions of the output light emission should be understood relative to the intensity which would correspond to an undistorted imaging. The distribution of the light intensity within the output light emission can additionally be varied depending on the alteration of the polarization state by the LCoS elements 14, 15, 24, 25, 34. However, a maximum achievable light intensity in a specific region is predefined by the imaging properties of the projection optical unit, and also depending on the intensity of the light source 11, 21, 31 and further properties of the optical system.

The distortion by the projection optical unit 16, 26a, 26b, 36 can be effected in various ways, wherein the pixels are imaged larger or smaller in different regions, which results in a correspondingly higher or lower luminous flux.

Alternatively or additionally, the output light emission can be formed in a different way by a superimposition of a plurality of modulations and/or light distributions. This can be effected by a superimposition of output emissions of two or more disclosed devices. Furthermore, the disclosed device can have two or more projection optical units 26a, 26b, as explained above with reference to FIG. 3. Furthermore, in a system in which a plurality of LCoS elements 14, 15, 24, 25, 34 are provided, a plurality of differently modeled distributions of the polarization states can be generated, for example, in the case explained above with reference to FIG. 2 wherein the transmitted and reflected portions of the light are modulated separately from one another by two LCoS elements 14, 15.

LIST OF REFERENCE SIGNS

1 Transportation vehicle
2 Control unit
3, 4 Headlight
5, 6 Device
11 Light source
12 Illumination optical unit
13 Polarizing beam splitter element
14, 15 Liquid crystal element; LCoS
16 Projection optical unit
21 Light source
22 Illumination optical unit
23a, 23b Polarizing beam splitter element
24, 25 Liquid crystal element; LCoS
26a, 26b Projection optical unit
31 Light source
32 Illumination optical unit
33 Polarizing beam splitter element
34 Liquid crystal element; LCoS
36 Projection optical unit
37 Mirror
40 Simulated brightness distribution (imaging)
41 Grid
42 Distorted grid (imaging)

The invention claimed is:

1. A device for generating an output light emission, the device comprising:
    a light source for emitting light;
    a first polarizing beam splitter element arranged such that at least one part of the emitted light impinges thereon, whereby a first reflected light beam of a first polarization state and a second transmitted light beam of a second polarization state are produced;
    first and second projection optical units;
    a control unit; and
    a first liquid crystal element having at least two states which are addressable by the control unit,
    wherein the first liquid crystal element at least partly reflects the first light beam, wherein the first polarization state of the first light beam is alterable based on the state of the first liquid crystal element,
    wherein the first polarizing beam splitter element is furthermore arranged such that the first reflected light beam impinges thereon after reflection at the first liquid crystal element, and
    wherein the first reflected light beam is at least partly coupled out by the first projection optical unit to generate the output light emission, and the second transmitted light beam is at least partly coupled out by the second projection optical unit to generate the output light emission, and
    wherein the first reflected light beam is only coupled out by the first projection optical unit and the second transmitted light beam is only coupled out by the second projection optical unit.

2. The device of claim 1, wherein the liquid crystal element is a liquid crystal on silicon (LCoS).

3. The device of claim 1, further comprising at least one cooling element, by which the first and/or the second liquid crystal element are/is coolable.

4. The device of claim 1, wherein the first liquid crystal element at least partly reflects the second transmitted light beam.

5. The device of claim 1, further comprising a second liquid crystal element, wherein the second liquid crystal element at least partly reflects the second transmitted light beam, wherein the polarization state of the second transmitted light beam is alterable based on the state of the second liquid crystal element.

6. The device of claim 5, wherein the first and/or the second liquid crystal element are/is embodied as a first and/or a second matrix of pixels.

7. The device of claim 1, further comprising a second polarizing beam splitter element on which the second transmitted light beam impinges and by which the second transmitted light beam is at least partly coupled out to generate the output light emission.

8. The device of claim 7, wherein the output light emission comprises a first component and a second component,
wherein the first component is coupled out by the first polarizing beam splitter element and the second component is coupled out by the second polarizing beam splitter element, and
wherein the first and second components are coupled out at positions spaced apart from one another.

9. The device of claim 1, wherein the first projection optical unit and/or the second projection optical unit generate the output light emission based on the light beam coupled so that the output light emission comprises an imaging having at least one inner and one outer region,
wherein the imaging is embodied such that the inner region has a higher light intensity than the outer region.

10. The device of claim 9, wherein the output light emission comprises a superimposition of at least two imagings, wherein the at least two imagings are formed by at least two projection optical units.

11. A headlight comprising at least one device as claimed in claim 1.

12. The headlight of claim 11, further comprising at least one projection optical unit having imaging properties enabling the first reflected light beam and/or the second transmitted light beam to be coupled out to generate the output light emission,
wherein the imaging properties of the projection optical unit are adjustable by the control unit.

13. A method for generating an output light emission, the method comprising:
emitting light by a light source;
impinging at least one part of the emitted light on a first polarizing beam splitter element, whereby a first reflected light beam of a first polarization state and a second transmitted light beam of a second polarization state are produced, wherein the first liquid crystal element has at least two states which are addressed by a control unit, and wherein the polarization state of the first reflected light beam is altered based on the state of the first liquid crystal element;
impinging the first reflected light beam on the first polarizing beam splitter element after reflection at the first liquid crystal element;
generating the output light emission by the first reflected light beam being at least partly coupled out by a first projection optical unit and the second transmitted light beam being at least partly coupled out by a second projection optical unit,
wherein the first reflected light beam is only coupled out by the first projection optical unit and the second transmitted light beam is only coupled out by the second projection optical unit.

* * * * *